US011520880B2

(12) United States Patent
Huang et al.

(10) Patent No.: US 11,520,880 B2
(45) Date of Patent: Dec. 6, 2022

(54) IDENTIFYING INTERNET OF THINGS NETWORK ANOMALIES USING GROUP ATTESTATION

(71) Applicant: International Business Machines Corporation, Armonk, NY (US)

(72) Inventors: Heqing Huang, Mahwah, NJ (US); Kapil K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 15/802,921

(22) Filed: Nov. 3, 2017

(65) Prior Publication Data

US 2019/0138716 A1    May 9, 2019

(51) Int. Cl.
| | | |
|---|---|---|
| *G06F 21/55* | (2013.01) | |
| *H04L 41/0893* | (2022.01) | |
| *G06F 21/57* | (2013.01) | |
| *H04L 9/40* | (2022.01) | |
| *H04L 43/065* | (2022.01) | |
| *H04W 12/12* | (2021.01) | |
| *H04L 41/0686* | (2022.01) | |
| *G06F 21/64* | (2013.01) | |
| *H04W 4/30* | (2018.01) | |

(52) U.S. Cl.
CPC ............ *G06F 21/552* (2013.01); *G06F 21/57* (2013.01); *G06F 21/645* (2013.01); *H04L 41/0686* (2013.01); *H04L 41/0893* (2013.01); *H04L 43/065* (2013.01); *H04L 63/1425* (2013.01); *H04L 63/20* (2013.01); *H04W 12/12* (2013.01); *H04W 4/30* (2018.02)

(58) Field of Classification Search
CPC ... G06F 21/552; G06F 21/57; H04L 41/0893; H04L 43/065; H04L 63/1425; H04L 63/20
See application file for complete search history.

(56) References Cited

U.S. PATENT DOCUMENTS 8,495,700 B2 *   7/2013   Shahbazi .............. H04L 63/105
                                                                      455/410
9,094,407 B1     7/2015   Matthieu et al.
9,849,364 B2 *   12/2017  Tran ........................ H04L 67/12
(Continued)

FOREIGN PATENT DOCUMENTS

WO          2016045513          3/2016

OTHER PUBLICATIONS

Byungchul Park, Fault Detection in IP-based Process Control networks using data mining, 2009, Dept. of Computer Science and Engineering, POSTECH, Korea.*

*Primary Examiner* — Vance M Little
(74) *Attorney, Agent, or Firm* — VanLeeuwen & VanLeeuwen; Jeffrey S. LaBaw (57) ABSTRACT

An approach is provided that identifies Internet of Things (IoT) network anomalies. The approach receives IoT endpoint device data at an attestation entity included in the network. The data is logged to a secured ledger and analyzed. Conditions pertaining to the IoT endpoint devices are analyzed with the analysis being based on a set of network policy data. Based on the analysis, the approach detects network anomalies that correspond to the IoT endpoint devices. These network anomalies and their corresponding IoT endpoint devices are then reported.

14 Claims, 7 Drawing Sheets

(56) References Cited

U.S. PATENT DOCUMENTS

| | | | |
|---|---|---|---|
| 10,484,406 B2* | 11/2019 | Vasseur | H04L 63/1416 |
| 2014/0096249 A1* | 4/2014 | Dupont | G06F 21/00 |
| | | | 726/23 |
| 2016/0006755 A1* | 1/2016 | Donnelly | H04L 63/18 |
| | | | 726/1 |
| 2016/0012424 A1 | 1/2016 | Simon et al. | |
| 2016/0219071 A1* | 7/2016 | Vasseur | H04L 63/1416 |
| 2017/0232300 A1* | 8/2017 | Tran | H04L 67/12 |
| | | | 434/247 |
| 2017/0302663 A1* | 10/2017 | Nainar | H04W 4/70 |

\* cited by examiner

IDENTIFYING INTERNET OF THINGS NETWORK ANOMALIES USING GROUP ATTESTATION

BACKGROUND

Description of Related Art

In a largely distributed Internet of Things (IoT) infrastructure, it is common to have multiple endpoints or "things" that contribute data towards a common goal. For example, a number of IoT sensors continuously collect data for various facets of an automobile in order to monitor its general health. Due to their physical exposure, IoT sensors are prone to a variety of physical and wireless channel errors, due to physical and/or software failures or due to targeted malicious attacks. One approach to address the problem is to build a root of trust in the IoT endpoint using hardware (e.g., TrustZone, etc.) or software (e.g. software Trusted Program Module (TPM), etc.) solutions. While these approaches can be effective in preventing certain types of failures and attacks, the approach suffers from multiple limitations. First, deploying such a solution on every IoT device is often not feasible due to resource constraints, lack of update channels, or cost considerations. Second, the heterogeneity in the hardware and endpoint ownership limits deployment of such solutions. Third, the IoT device can still be compromised acting as a single point-of-failure if vulnerability exist in the root of trust. For example, a software TPM could be exploited if the hardware is compromised.

SUMMARY

An approach is provided that identifies Internet of Things (IoT) network anomalies. The approach receives IoT endpoint device data at an attestation entity included in the network. The data is logged to a secured ledger and analyzed. Conditions pertaining to the IoT endpoint devices are analyzed with the analysis being based on a set of network policy data. Based on the analysis, the approach detects network anomalies that correspond to the IoT endpoint devices. These network anomalies and their corresponding IoT endpoint devices are then reported.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIG. 3-7 depict an approach of "group attestation" to detect software errors, physical errors and malicious attacks. The core idea of the approach is to detect errors and/or attacks by using network or group attestation across the participating Internet of Things (IoT) sensors. Such attestation (1) leverages relevant context collected from the endpoint(s); and (2) cross-validates data across the readings from various sensors. An anomaly is reported when one endpoint reading conflicts with related and/or neighboring endpoints based on IoT network-specific logic.

For example, if a car speedometer reading does not align with the readings from the gas usage sensors, it could potentially represent an anomaly. To enable group attestation for mutually distrusting parties, public ledger solutions such as Blockchain are used to collect the data. The approach described herein requires minimal, if any, changes to IoT endpoints and can be applied to existing IoT setups without physical modification to the legacy devices. Additionally, this approach detects anomalies even when the hardware and/or software on the endpoint(s) is compromised, thus addressing the single point-of-failure problem in existing solutions.

In one embodiment, the approach pertains to the use of public ledger system and "group" attestation to autonomously identify anomalies in an IoT network built for a specific task. A public/private ledger (e.g. Blockchain, etc.) logs data from all of the participating IoT endpoints. The owner or administrator for the particular IoT network (e.g. car manufacturer for the automobile network, etc.) defines normal behavior for the network, such as normal working conditions, normal ranges for sensor readings, proper correlation ranges between sensor readings, and the like. An attestation entity, defined by the owner or elected by the participating entities, performs the attestation based on the context data and cross-correlation across endpoint readings. Complementing external information, such as device's location, relevant world events, and the like, are also considered as part of the context data for detecting anomalies. For example, if a car was reported to be destroyed in a fire and still data is being received from its sensors, it represents an anomaly. Group attestation is used to show that data posted to the secure ledger is "true" data, as corroborated by a group of devices with the recorded data being protected by means of the secure ledger, secured using, e.g., Blockchain or other distributed transaction ledger that provides an unalterable and robust list of transactions posted to the secure ledger.

In embodiments of the invention, a group attestation performed by the attesting entity, not only attests that the outputs of the IoT devices are "true", but also that they are consistent, i.e., likely accurate, with a known network condition. Furthermore, in embodiments of the invention, a network policy is used to evaluate the outputs of the group of IoT devices. In these embodiments, the network policy represents a set of IoT outputs for a given network condition. The IoT outputs may be expressed as a range of outputs within a particular network policy.

As a more in depth example, imagine an automobile that is reporting data using a variety of sensors. In this example, the speedometer is reporting a speed of 65 miles per hour, the electronic gyroscope is reporting that the vehicle is traveling on a primarily flat surface (i.e., not coasting downhill), and the fuel consumption sensor is reporting that the vehicle is consuming a negligible amount of fuel. While each of these sensor readings are appropriate for the individual sensors (e.g., a 65 MPH reading from a speedometer is within acceptable range of the speedometer, while a 650 MPH reading would be deemed a sensor error, a flat reading from the gyroscope is an acceptable reading from the gyroscope, and a negligible fuel consumption is an acceptable reading from the fuel consumption sensor when the vehicle is idling or coasting), the combined set of sensor readings is not acceptable. When this particular vehicle is traveling at 65 MPH on a flat surface a particular amount of fuel consumption is expected with that amount being more than a negligible amount. So, in this case, either the speedometer sensor is defective with the vehicle actually traveling 0 MPH (idling), the gyroscope is defective with the vehicle actually traveling downhill (coasting), or the fuel consumption sensor is defective with the vehicle actually consuming more than a negligible amount of fuel. Moreover, multiple sensors might be defective (e.g., both the gyroscope and the fuel consumption sensor, etc.). By using group attestation, the system cross-validates the readings from the individual sensors and determines that one or more of the readings are not appropriate given the readings received from the other sensors. An error is then detected due to the cross-validation error and the system reports the error to an error log.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
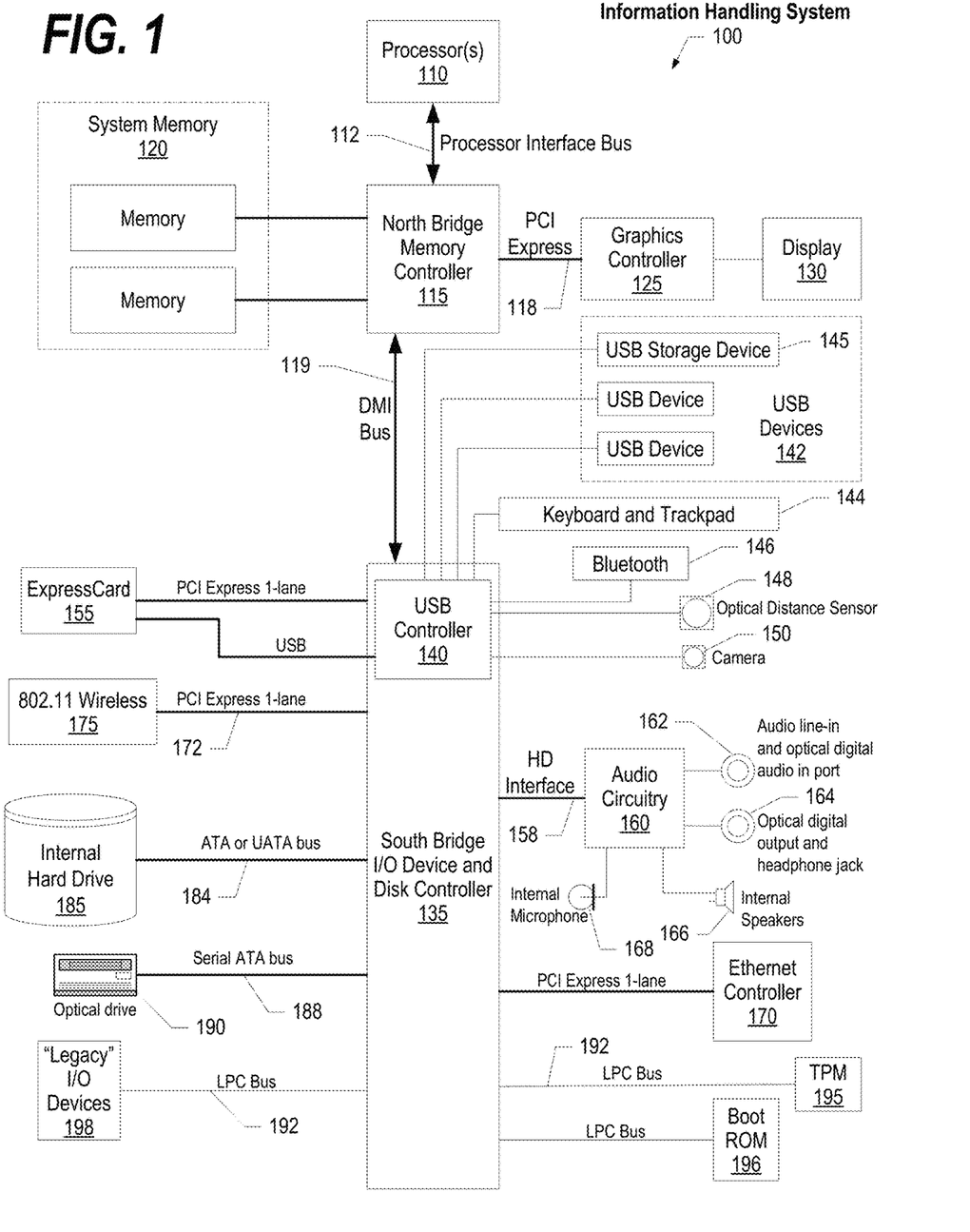
FIG. 1 depicts a block diagram of a network of data processing systems in which illustrative embodiments may be implemented.
Figure 2:
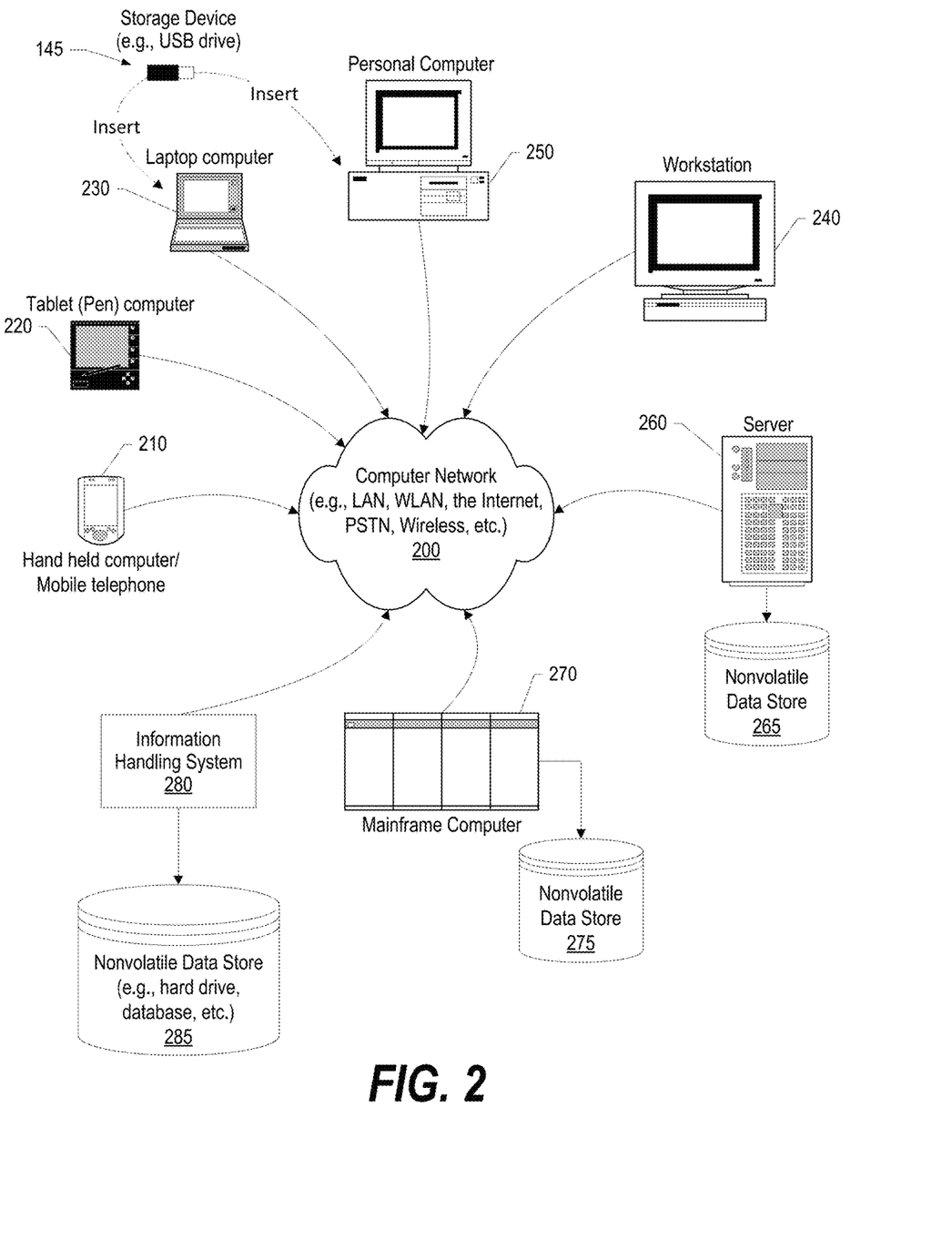
FIG. 2 depicts a block diagram of a data processing system in which illustrative embodiments may be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
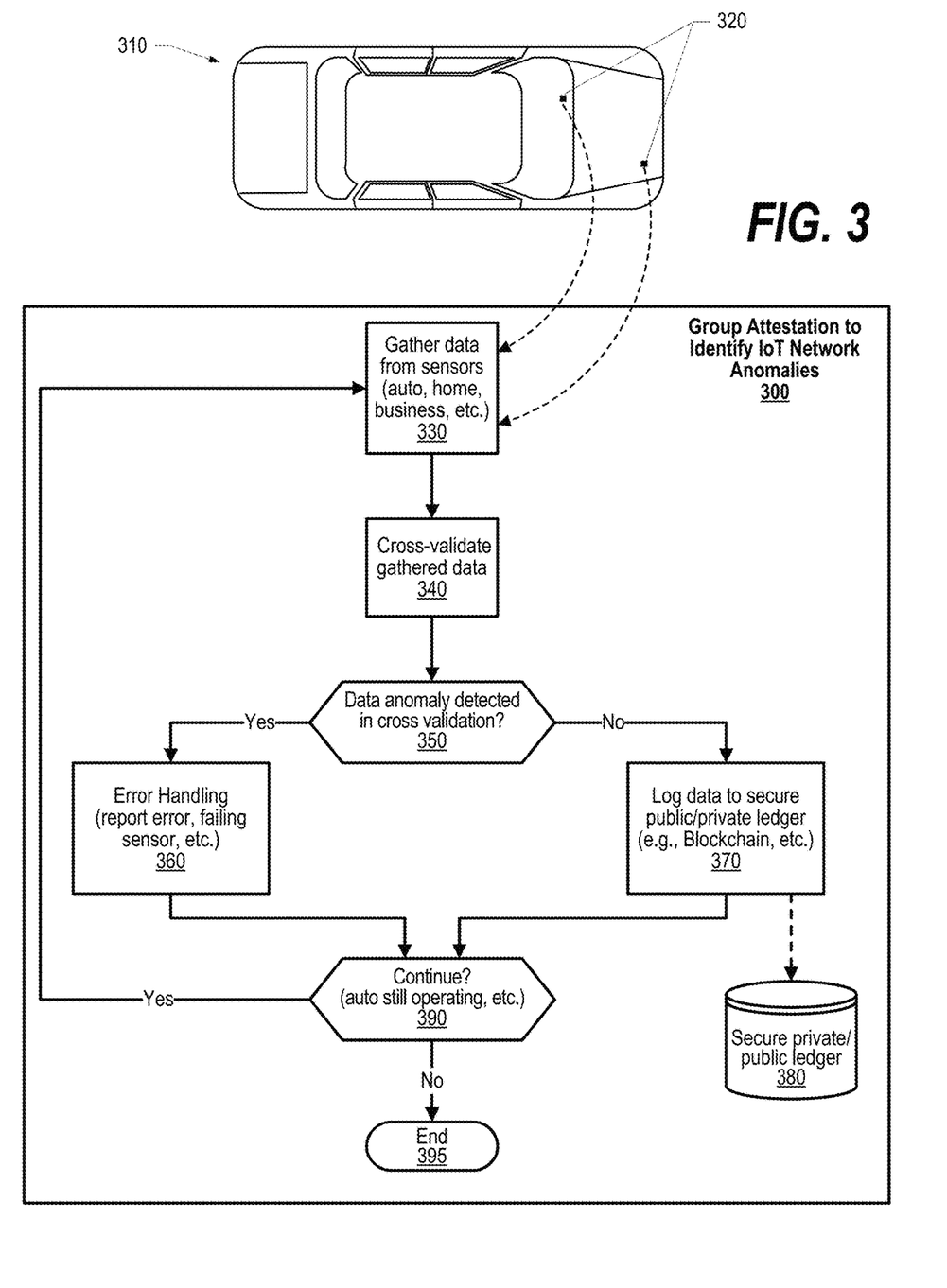
FIG. 3 depicts a system diagram showing the various components used in identifying Internet of Things (IoT) network anomalies using group attestation.

FIG. 3 depicts a system diagram showing the various components used in identifying Internet of Things (IoT) network anomalies using group attestation. FIG. 3 depicts an automobile implementation that is equipped with sensors that are part of an Internet of Things (IoT) network from which anomalies are detected. Group attestation 300 is used to identify the IoT network anomalies using the steps shown. Automobile 310 includes sensors 320. At step 330, an attestation entity that is part of the IoT network receives IoT endpoint device data from sensors. Conditions pertaining to the IoT endpoint devices are analyzed with the analysis being based on a set of network policy data. In one embodiment, data from the IoT endpoints is cross validated at step 340. The process determines whether a data anomaly is detected in the cross validation (decision 350). If anomalies are detected based on the analysis, then the process branches to the 'yes' branch whereupon, at step 360, the process reports the anomaly as part of error handling procedures shown in step 360. On the other hand, if anomalies are not detected, then decision 350 branches to the 'no' branch whereupon, at step 370, the data is logged to secured ledger 380. The secured ledger might be a public ledger or a private ledger and the data might be secured using a Blockchain algorithm that prevents malevolent users from altering the data without being detected. A determination is made whether the process should continue (decision 390). Depending on the system, the process might continue while the system continues to operate (e.g., while an automobile continues to operate, etc.). If the system continues to operate, then decision 390 branches to the 'yes' branch which loops back to continue gathering data from IoT endpoints, such as sensors, etc. This looping continues until the system is halted, at which point decision 390 branches to the 'no' branch and the process ends at 395.

Figure 4:
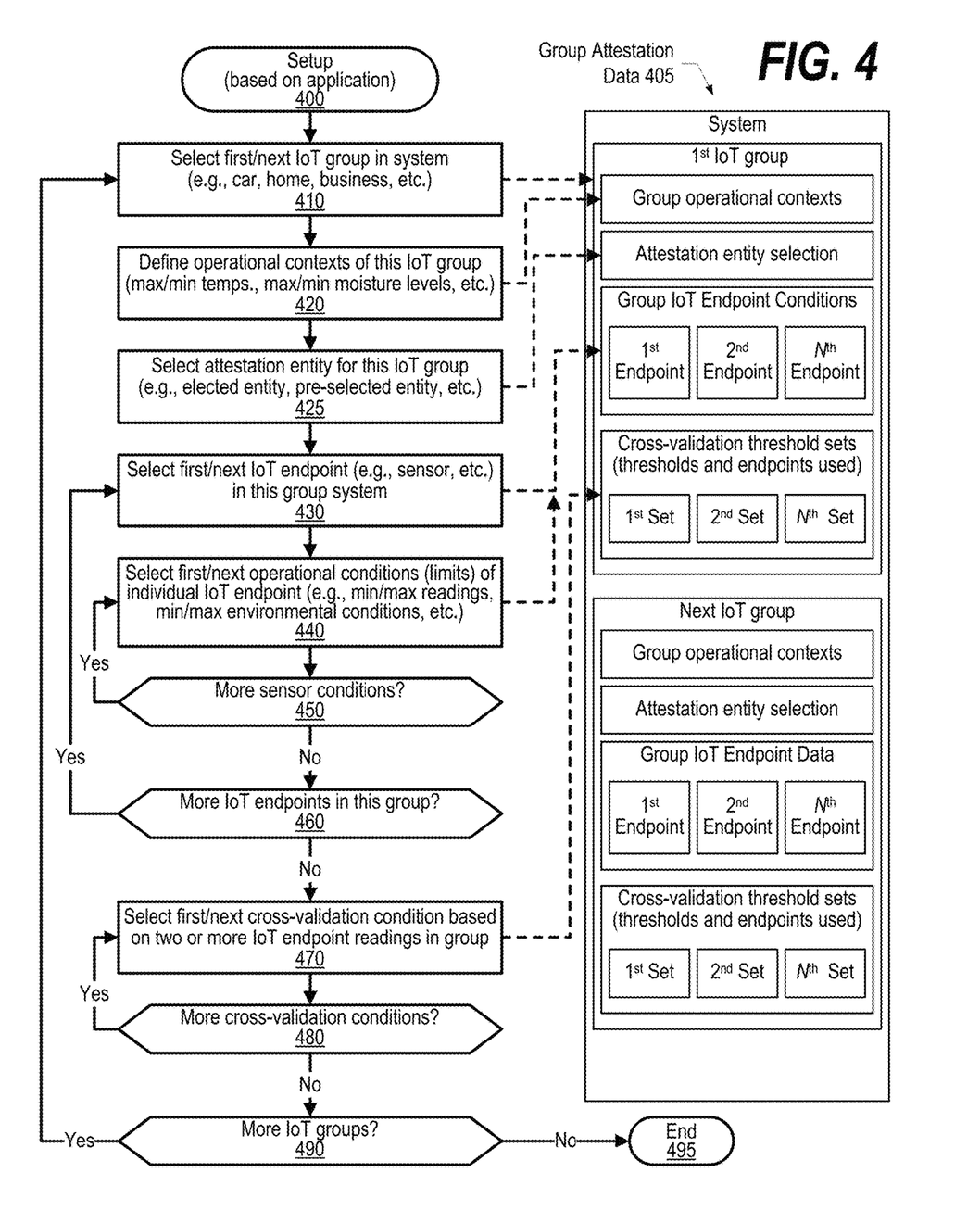
FIG. 4 depicts a flowchart of a process that is performed to setup a system that identifies Internet of Things (IoT) network anomalies using group attestation.

FIG. 4 depicts a flowchart of a process that is performed to setup a system that identifies Internet of Things (IoT) network anomalies using group attestation. The network anomalies can be detected in many different types of systems such as automobile system, a home or business system, or any other system that has multiple IoT endpoints. Group attestation data 405 that is setup can be viewed as network policy data that is established so that tests and comparisons can be made to detect and otherwise identify anomalies in the network. In one embodiment, the group attestation data includes any number of IoT groups with each of these IoT groups including any number of IoT endpoints.

In an automobile setting, an IoT group might be related to fuel consumption with one IoT endpoint being a fuel gauge sensor, another IoT endpoint being an odometer sensor, and perhaps other IoT endpoints being environmental sensors that provide data pertaining to the ambient conditions in which the automobile is operated. Each IoT group can include one or more group operational contexts that define the operational contexts of the group, such as temperature extremes, moisture level extremes, and the like. Each IoT group can also include an attestation entity selection that defines how an attestation entity is selected for this IoT group. Each IoT group can also include group IoT endpoint conditions that define the various IoT endpoint devices that are included in this IoT group along with operational conditions that apply to the various IoT endpoint devices.

For example, a fuel gauge sensor included in the IoT group might have operational conditions that set the minimum and maximum amount of fuel that can be detected. If the maximum amount of fuel that can be detected in a system is twenty gallons of fuel but the sensor reports fifty gallons of fuel, the operational condition is violated and a report is made that a network anomaly has been detected in the fuel gauge sensor. Each IoT group can also include sets of cross-validation thresholds. For example, a set of cross-validation thresholds might include a fuel usage sensor, a speedometer, and an accelerometer that senses whether the automobile is traveling uphill or downhill. When the speed is at a certain value, such as fifty MPH, and the accelerometer senses that the automobile is traveling uphill or on a flat road, if the fuel gauge senses little or no fuel consumption, then a cross-validation condition might be detected indicating a problem with the fuel consumption sensor. Any number of IoT groups can be setup using the processing shown.

Processing shown in FIG. 4 commences at 400 whereupon, at step 410, the process selects the first IoT group in the system, with the system being related to the IoT network that is being established. At step 420, the process, using inputs from the user or from other data stores, defines the operational contexts of the IoT group that was selected in step 410. These operational contexts may include such things as maximum and minimum temperatures, maximum and minimum moisture levels, or any other environmental or non-environmental contexts within which the IoT group operates. The IoT group selected and the group operational contexts are stored in group attestation data 405.

At step 425, the attestation entity that is to be used for the selected IoT group is selected by any of a variety of means. For example, the attestation entity can be elected by the entities in the group, can be a pre-selected entity, randomly selected, etc. The attestation entity selection is also stored in group attestation data 405. At step 430, the first IoT endpoint that is included in the selected IoT group is selected. The IoT endpoint might be a sensor or any entity that is included in the IoT group. At step 440, the first set of one or more operational conditions, or limits, that apply to the individual IoT endpoint selected in step 430 are selected. The operational conditions might be minimum and maximum readings valid for the endpoint, minimum and maximum temperatures, moisture levels, or other environmental conditions, or the like. The endpoints and the endpoint operational conditions are stored in group attestation data 405.

The process determines as to whether there are more sensor, or operational, conditions that apply to the selected IoT endpoint (decision 450). If there are more operational conditions, then decision 450 branches to the the "yes" branch that loops back to select the next set of operational conditions of the selected IoT endpoint. This looping continues until there are no more operational conditions for the selected IoT endpoint, at which point decision 450 branches to the "no" branch exiting the loop.

The process determines as to whether there are more IoT endpoints that are included in this IoT group (decision 460). If there are more IoT endpoints that are included in this IoT group, then decision 460 branches to the the "yes" branch which loops back to select the next IoT endpoint and process the operational conditions as described above. This looping continues until there are no more IoT endpoints to include in this IoT group, at which point decision 460 branches to the the "no" branch exiting the loop.

At step 470, the process selects the first set of one or more cross-validation conditions that are based upon two or more IoT endpoint readings in the group. For example, in an automobile setting, the fuel consumption sensor might be cross-validated with a speedometer sensor and a gyroscopic sensor so that an extremely low fuel consumption or extremely high fuel consumption condition would be considered invalid when the speedometer reading is between certain speeds and the gyroscope indicates that the vehicle is traveling on a relatively flat (non-inclined) surface. The cross-validation condition that is based on two or more IoT endpoint readings in the IoT group are stored in group attestation data 405.

The process determines as to whether there are more cross-validation conditions to define (decision 480). If there are more cross-validation conditions to define, then decision 480 branches to the "yes" branch which loops back to step 470 to receive the next cross-validation condition selection as described above. This looping continues until there are no more cross-validation conditions that are being selected, at which point decision 480 branches to the "no" branch exiting the loop.

The process determines as to whether there are additional IoT groups to define for the group attestation data (decision 490). If there are more IoT groups to define, then decision 490 branches to the "yes" branch which loops back to define the next IoT group to include in group attestation data 405 (the operational contexts, the attestation entity, the IoT endpoints in the group, the conditions of the individual endpoints, and the cross-validation conditions between two or more endpoints) as described above. This looping continues until no more IoT groups are being defined, at which point decision 490 branches to the "no" branch and processing ends at 495.

Figure 5:
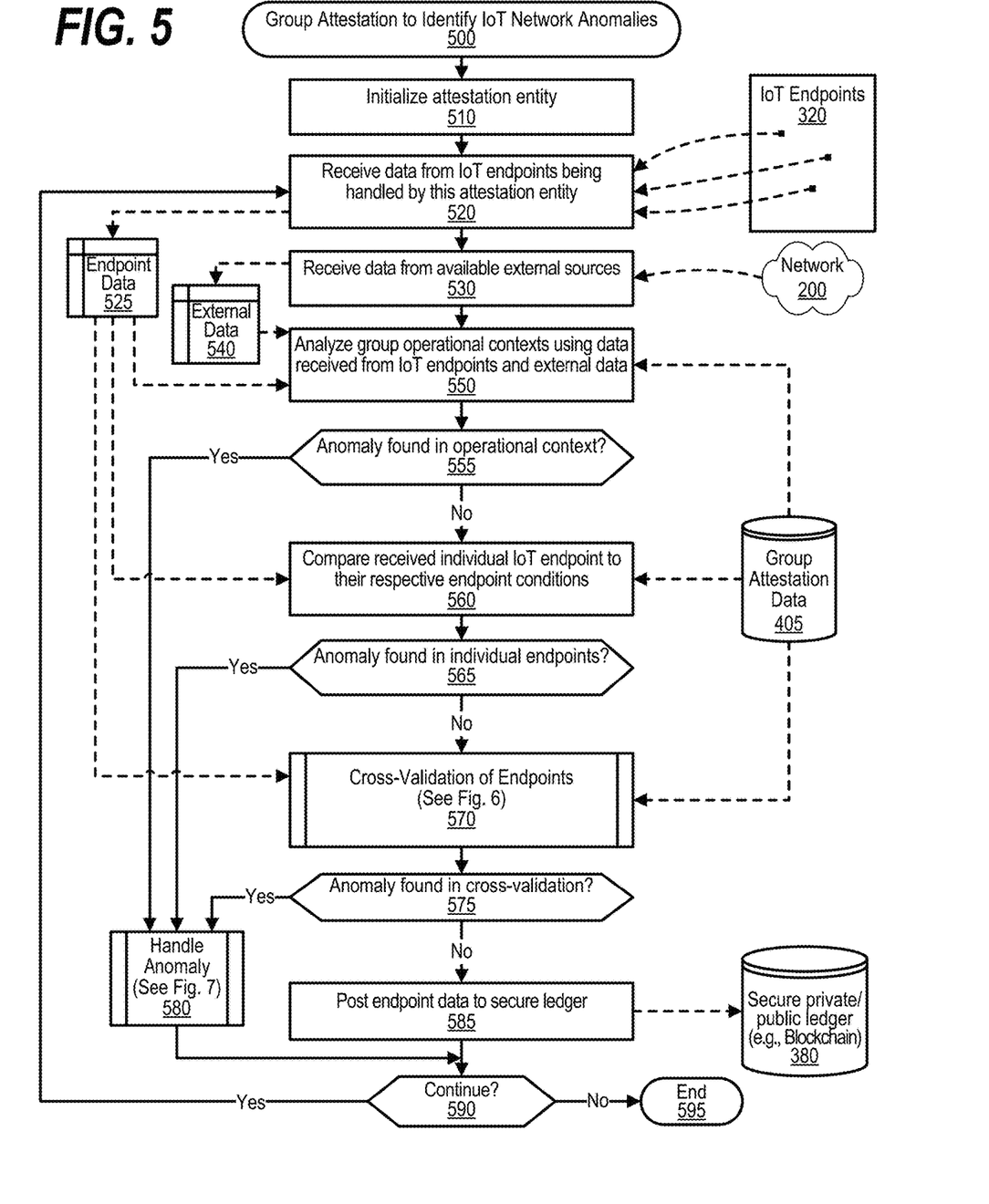
FIG. 5 depicts a higher level flowchart that identifies Internet of Things (IoT) network anomalies using group attestation.

FIG. 5 depicts a higher level flowchart that identifies Internet of Things (IoT) network anomalies using group attestation. Processing commences at 500 whereupon, at step 510, the process initializes the attestation entity used by the group through the means previously selected (elected by the entities in the group, pre-selected, randomly selected, etc.). At step 520, the process receives data from IoT endpoints 320 that are being handled by this attestation entity (e.g., endpoints included in same group as this attestation entity, etc.). The endpoint data received is stored in memory area 525. At step 530, the process receives data relevant to the IoT group from available external sources (e.g., environmental data such as temperature, moisture, etc., other external source data, etc.). The received external data is stored in memory area 540.

At step 550, the process analyzes the group operational contexts for this IoT group using the data received from the IoT endpoints as well as from the external data that was received with the group operational contexts being received from data store 405. The process determines as to whether one or more anomalies were found in the operational context (decision 555). If an anomaly was found, then decision 555 branches to the "yes" branch to handle the anomaly using predefined process 580 (see FIG. 7 and corresponding text for further processing details). On the other hand, if no anomalies were found in the operational context for the IoT group, then decision 555 branches to the "no" branch to continue processing.

At step 560, the process compares the individual IoT endpoint data to their respective IoT endpoint conditions as defined in group attestation data 405. The process determines as to whether any anomalies were found in one or more of the individual IoT endpoints (decision 565). If any anomalies were found, then decision 565 branches to the "yes" branch to handle the anomaly using predefined process 580 (see FIG. 7 and corresponding text for further processing details).

Figure 6:
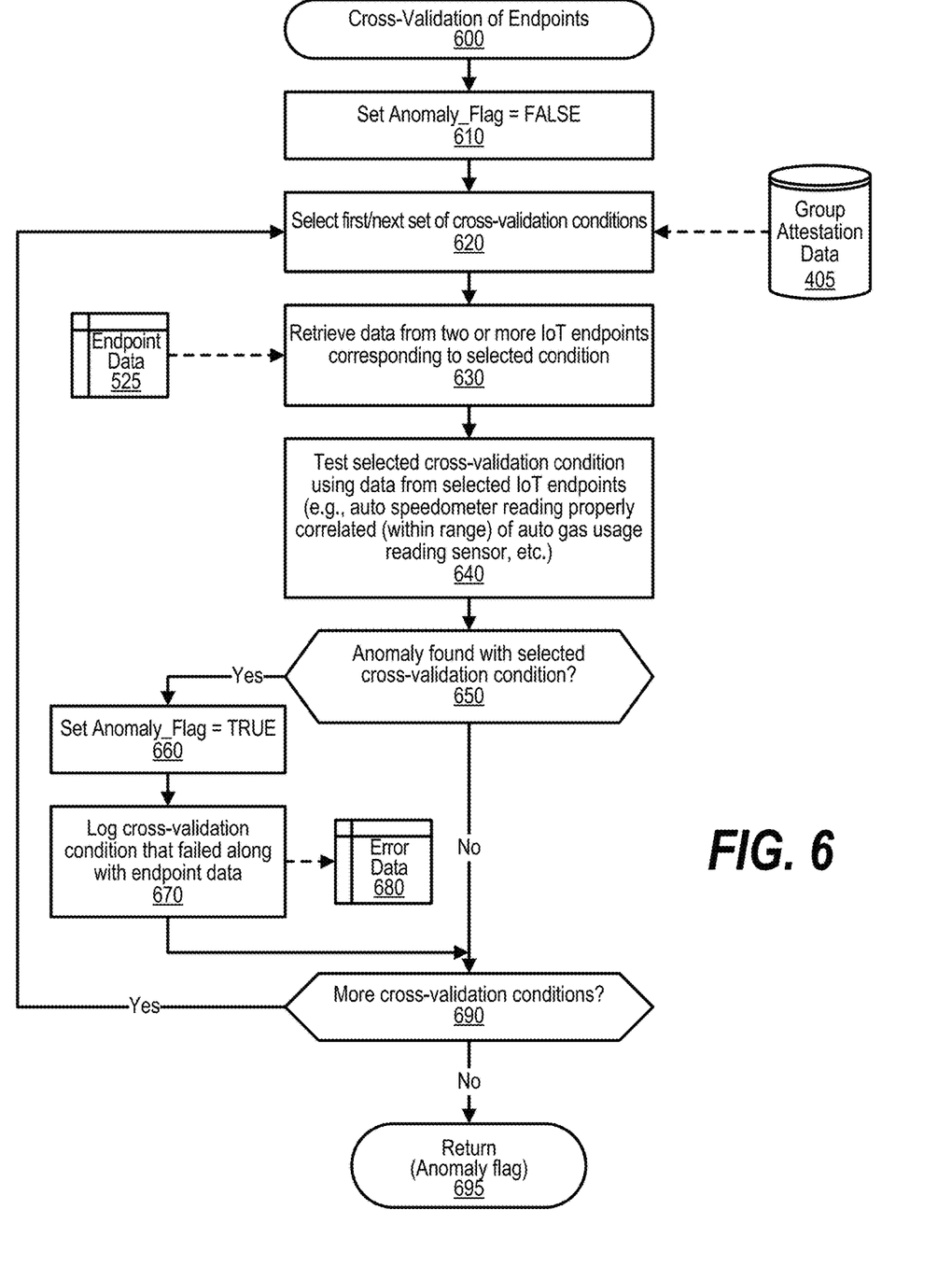
FIG. 6 depicts a flowchart of a process that cross validates endpoints in the network in order to identify anomalies.

On the other hand, if no anomalies were found in any of the individual IoT endpoints, then decision 565 branches to the "no" branch whereupon, at predefined process 570, the process performs the cross-validation of endpoints routine (see FIG. 6 and corresponding text for further processing details). Based on the results of predefined process 570, the process determines whether any anomalies were found in any of the cross-validations between IoT endpoints (decision 575). If any anomalies were found in the cross-validations, then decision 575 branches to the "yes" branch to handle the anomaly using predefined process 580 (see FIG. 7 and corresponding text for further processing details). However, if no anomalies were found in the cross-validation checking, then decision 575 branches to the "no" branch for further processing.

At step 585, the process posts the endpoint data to secure ledger 380 with the ledger being secured using a Blockchain technique or other technique that greatly reduces the chance or ability to alter the ledger without detection. In one embodiment, endpoint data is posted to the secure ledger when no anomalies are found, while in another embodiment, the endpoint data is posted to the secure ledger regardless of whether anomalies are detected in any of the endpoint data or during cross-validation.

The process determines as to whether the recordation of group IoT endpoint data is continuing (decision 590). If the process is continuing, then decision 590 branches to the "yes" branch which loops back to continue receiving IoT endpoint data and processing the data as described above. This looping continues until the process is terminated, at which point decision 590 branches to the "no" branch and processing ends at 595.

FIG. 6 depicts a flowchart of a process that cross validates endpoints in the network in order to identify anomalies. The cross validation of endpoints routine commences at 600 whereupon, at step 610, the anomaly flag is set to FALSE indicating that no cross validation anomalies have been detected. At step 620, the process selects the first set of cross-validation conditions for this IoT group with the cross-validation conditions being retrieved from group attestation data 405.

At step 630, the process retrieves the data from two or more IoT endpoints that are associated with the selected cross-validation condition. The IoT endpoint data is retrieved from memory area 525, having been retrieved in the process shown in FIG. 5.

At step 640, the process tests the selected cross-validation condition using the data retrieved from the selected IoT endpoints. For example, the cross-validation condition might be an automobile speedometer reading properly correlated (within range) of auto gas usage reading sensor, etc.). The process determines as to whether an anomaly was detected from the testing of the cross-validation condition performed in step 640 (decision 650). If an anomaly was found, then decision 640 branches to the "yes" branch to perform steps 660 and 670. On the other hand, if no anomaly was found, then decision 650 branches to the "no" branch bypassing steps 660 and 670.

If an anomaly was found, then steps 660 and 670 are performed. At step 660, the process sets the anomaly flag to TRUE indicating that the cross-validation routine discovered an anomaly. At step 670, the process logs the cross-validation condition that failed the testing performed in step 640 along with the IoT endpoints and IoT endpoint data that was used in the testing. The error data is stored in memory area 680.

After the selected cross-validation condition has been processed as described above, the process determines as to whether there are more cross-validation conditions to process (decision 690). If there are more cross-validation conditions, then decision 690 branches to the "yes" branch which loops back to step 630 to select the next set of cross-validation conditions and process the selected cross-validation conditions as described above. This looping continues until there are no more cross-validation conditions to process, at which point decision 690 branches to the "no" branch and processing returns to the calling routine at 695 (see FIG. 5) with a return code indicating whether an anomaly was detected.

Figure 7:
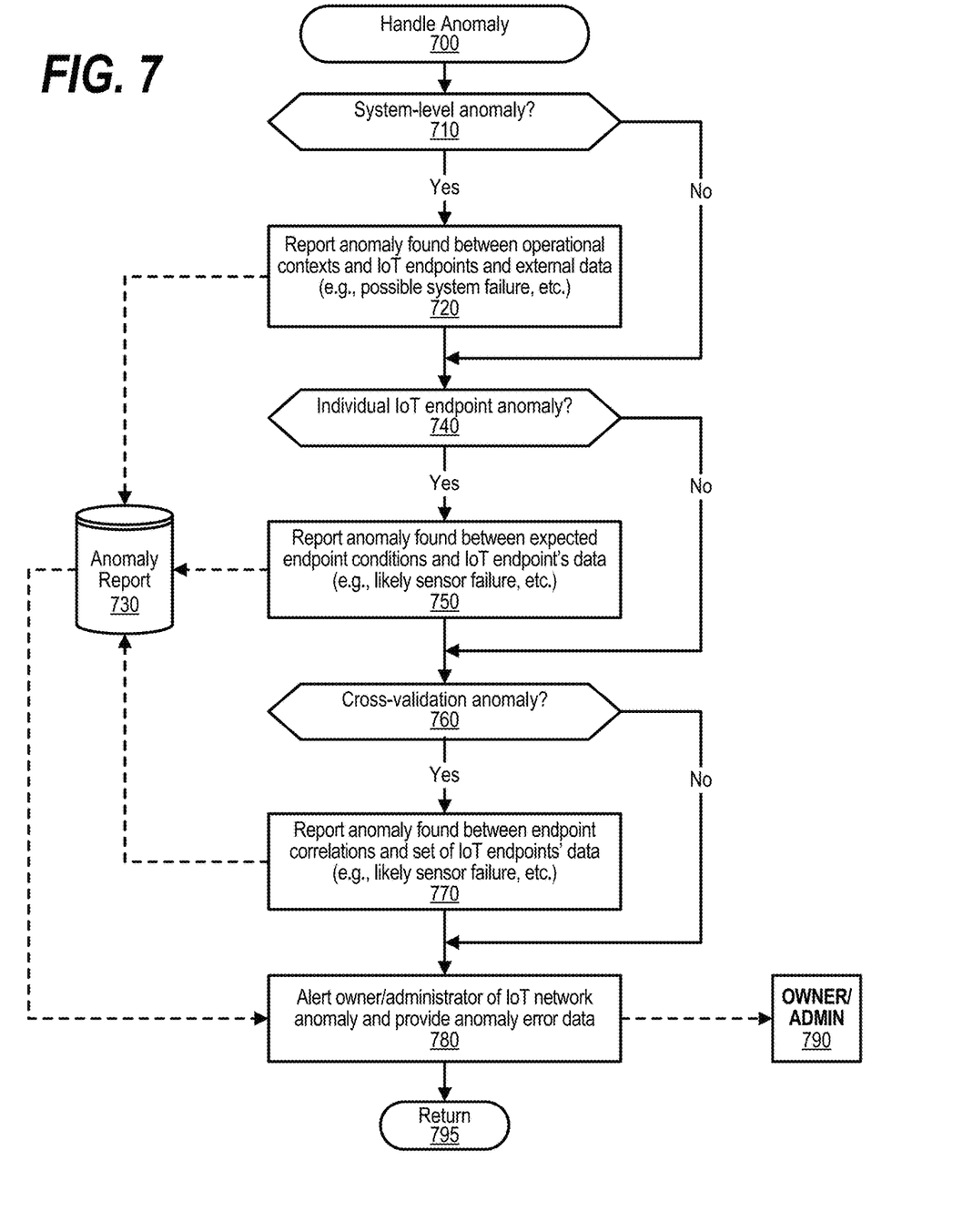
FIG. 7 depicts a flowchart of a process that handles anomalies that might be found during the cross validation of network endpoints.

FIG. 7 depicts a flowchart of a process that handles anomalies that might be found during the cross validation of network endpoints. The anomaly handling routine commences at 700 whereupon the process determines as to whether a system-level anomaly was detected (decision 710). If a system-level anomaly was detected, then decision 710 branches to the "yes" branch whereupon, at step 720, the process reports the anomaly found between operational contexts and the IoT endpoint data as well the external data that was collected with the system-level anomaly possibly being a system failure or the like. The system-level anomaly data is reported by writing the system-level anomaly data to anomaly report data store 730. On the other hand, if a system-level anomaly was not found, then decision 710 branches to the "no" branch bypassing step 720.

The process determines as to whether an individual IoT endpoint anomaly was detected (decision 740). If an individual IoT endpoint anomaly was detected, then decision 740 branches to the "yes" branch whereupon, at step 750, the process reports the anomaly found between the expected endpoint conditions and the IoT endpoint's data. For example, the individual IoT endpoint anomaly might be a likely sensor failure, etc. The individual IoT endpoint anomaly data is reported by writing the individual IoT endpoint anomaly to anomaly report data store 730. On the other hand, if an individual IoT endpoint anomaly was not detected, then decision 740 branches to the "no" branch bypassing step 750.

The process determines as to whether a cross-validation anomaly was detected (decision 760). If a cross-validation anomaly was detected, then decision 760 branches to the "yes" branch whereupon, at step 760, the process reports the anomaly found between endpoint correlations and set of IoT endpoints' data. For example, the cross-validation anomaly might indicate a likely sensor failure, etc. The cross-validation anomaly data is reported by writing the individual IoT endpoint anomaly to anomaly report data store 730. On the other hand, if a cross-validation anomaly was not detected, then decision 760 branches to the "no" branch bypassing step 770.

At step 780, the process alerts the owner or administrator of the IoT network of the detected anomaly and provides the anomaly report stored in data store 730 to the owner/administrator 790. Processing then returns to the calling routine (see FIG. 5) at 795.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a set of endpoint data at an attestation entity from a plurality of Internet of Things (IoT) endpoint devices included in an IoT network, wherein the set of endpoint data is based on a plurality of sensor readings of the plurality of IoT endpoint devices;
   analyzing the set of endpoint data against a set of conditions based on a set of network policy data pertaining to the plurality of IoT endpoint devices;
   in response to determining that the set of endpoint data passes the set of conditions:
      selecting a first IoT endpoint device and a second IoT endpoint device from the set of IoT endpoint devices;

capturing a first subset of the set of endpoint data corresponding to the first IoT device and capturing a second subset of the set of endpoint data corresponding to the second IoT device;

cross-validating the first IoT endpoint device against the second IoT device by testing the first subset of endpoint data and the second subset of endpoint data against a set of cross-validation conditions corresponding to the first IoT endpoint device and the second IoT device;

detecting, based upon the testing, that one or more network anomalies corresponds to the set of cross-validation conditions; and reporting the detected one or more network anomalies and their corresponding IoT endpoint devices, wherein the reporting includes the set of cross-validation conditions; and in response to determining that the set of endpoint data comprises one or more anomalies:

comparing a set of acceptable device operational parameters to a set of conditions pertaining to a selected one of the plurality of IoT endpoint devices; and based on the comparing, detecting that at least one of the one or more network anomalies pertains to the selected one of the IoT endpoint devices, wherein the reporting indicates a failure of the selected one of the IoT endpoint devices and comprises at least one of the conditions of the selected one of the IoT endpoint devices that failed to meet one of the sets of acceptable device operational parameters.

2. The method of claim 1 further comprising:

receiving, at the attestation entity, external data provided by one or more external sources;

analyzing one or more group operational contexts based upon the data received from a different set of IoT endpoint devices and the external data; and based upon the analyzing of the one or more group operational contexts, detecting that one of the one or more network anomalies is found in the one or more group operational contexts, wherein the reporting includes the different set of IoT endpoint devices and the external data.

3. The method of claim 2 wherein the one or more external sources are selected from a group consisting of a device sensor, a GPS that provides a geographic location, and an environmental sensor that provides a set of environmental data.

4. The method of claim 1 wherein the network policy data defines normal behavior of the IoT network, and wherein at least one network behavior is selected from the group consisting of a normal working condition, a sensor reading range, and a correlation between a plurality of sensor readings.

5. The method of claim 1 further comprising:

logging the data to a secured ledger, wherein the secured ledger is stored in a Blockchain.

6. An information handling system comprising:

one or more processors;

a memory coupled to at least one of the processors;

a set of instructions stored in the memory and executed by at least one of the processors to perform actions comprising:

receiving a set of endpoint data at an attestation entity from a plurality of Internet of Things (IoT) endpoint devices included in an IoT network, wherein the set of endpoint data is based on a plurality of sensor readings of the plurality of IoT endpoint devices;

analyzing the set of endpoint data against a set of conditions based on a set of network policy data pertaining to the plurality of IoT endpoint devices; and in response to determining that the set of endpoint data passes the set of conditions:

selecting a first IoT endpoint device and a second IoT endpoint device from the set of IoT endpoint devices;

capturing a first subset of the set of endpoint data corresponding to the first IoT device and capturing a second subset of the set of endpoint data corresponding to the second IoT device;

cross-validating the first IoT endpoint device against the second IoT device by testing the first subset of endpoint data and the second subset of endpoint data against a set of cross-validation conditions corresponding to the first IoT endpoint device and the second IoT;

detecting, based upon the testing, that one or more network anomalies corresponds to the set of cross-validation conditions; and reporting the detected one or more network anomalies and their corresponding IoT endpoint devices, wherein the reporting includes the set of cross-validation conditions; and in response to determining that the set of endpoint data comprises one or more anomalies:

comparing a set of acceptable device operational parameters to a set of conditions pertaining to a selected one of the plurality of IoT endpoint devices; and based on the comparing, detecting that at least one of the one or more network anomalies pertains to the selected one of the IoT endpoint devices, wherein the reporting indicates a failure of the selected one of the IoT endpoint devices and comprises at least one of the conditions of the selected one of the IoT endpoint devices that failed to meet one of the sets of acceptable device operational parameters.

7. The information handling system of claim 6 wherein the actions further comprise:

receiving, at the attestation entity, external data provided by one or more external sources;

analyzing one or more group operational contexts based upon the data received from a different set of IoT endpoint devices and the external data; and based upon the analyzing of the one or more group operational contexts, detecting that one of the one or more network anomalies is found in the one or more group operational contexts, wherein the reporting includes the different set of IoT endpoint devices and the external data.

8. The information handling system of claim 7 wherein the one or more external sources are selected from a group consisting of a device sensor, a GPS that provides a geographic location, and an environmental sensor that provides a set of environmental data.

9. The information handling system of claim 6 wherein the network policy data defines normal behavior of the IoT network, and wherein at least one network behavior is selected from the group consisting of a normal working condition, a sensor reading range, and a correlation between a plurality of sensor readings.

10. The information handling system of claim 6 wherein the actions further comprise:
   logging the data to a secured ledger, wherein the secured ledger is stored in a Blockchain.

11. A computer program product comprising:
   a computer readable storage medium comprising a set of computer instructions, the computer instructions effective to cause an information handling system to perform actions comprising:
      receiving a set of endpoint data at an attestation entity from a plurality of Internet of Things (IoT) endpoint devices included in an IoT network, wherein the set of endpoint data is based on a plurality of sensor readings of the plurality of IoT endpoint devices;
      analyzing the set of endpoint data against a set of conditions based on a set of network policy data pertaining to the plurality of IoT endpoint devices; and
      in response to determining that the set of endpoint data passes the set of conditions:
         selecting a first IoT endpoint device and a second IoT endpoint device from the set of IoT endpoint devices;
         capturing a first subset of the set of endpoint data corresponding to the first IoT device and capturing a second subset of the set of endpoint data corresponding to the second IoT device;
         cross-validating the first IoT endpoint device against the second IoT device by testing the first subset of endpoint data and the second subset of endpoint data against a set of cross-validation conditions corresponding to the first IoT endpoint device and the second IoT device;
         detecting, based upon the testing, that one or more network anomalies corresponds to the set of cross-validation conditions; and
         reporting the detected one or more network anomalies and their corresponding IoT endpoint devices, wherein the reporting includes the set of cross-validation conditions; and
      in response to determining that the set of endpoint data comprises one or more anomalies:
         comparing a set of acceptable device operational parameters to a set of conditions pertaining to a selected one of the plurality of IoT endpoint devices; and
         based on the comparing, detecting that at least one of the one or more network anomalies pertains to the selected one of the IoT endpoint devices, wherein the reporting indicates a failure of the selected one of the IoT endpoint devices and comprises at least one of the conditions of the selected one of the IoT endpoint devices that failed to meet one of the sets of acceptable device operational parameters.

12. The computer program product of claim 11 wherein the actions further comprise:
   receiving, at the attestation entity, external data provided by one or more external sources;
   analyzing one or more group operational contexts based upon the data received from a different set of IoT endpoint devices and the external data; and
   based upon the analyzing of the one or more group operational contexts, detecting that one of the one or more network anomalies is found in the one or more group operational contexts, wherein the reporting includes the different set of IoT endpoint devices and the external data.

13. The computer program product of claim 12 wherein the one or more external sources are selected from a group consisting of a device sensor, a GPS that provides a geographic location, and an environmental sensor that provides a set of environmental data.

14. The computer program product of claim 11 wherein the network policy data defines normal behavior of the IoT network, and wherein at least one network behavior is selected from the group consisting of a normal working condition, a sensor reading range, and a correlation between a plurality of sensor readings.

\* \* \* \* \*